United States Patent [19]

Yanagawa et al.

[11] 3,937,975
[45] Feb. 10, 1976

[54] COMBINED LOAD SENSING PRESSURE PROPORTIONING RELAY VALVE

[75] Inventors: Itiro Yanagawa; Isao Suzuki, both of Higashimatsuyama, Japan

[73] Assignee: Jidosha Kiki Co. Ltd., Japan

[22] Filed: Nov. 15, 1974

[21] Appl. No.: 524,136

[30] Foreign Application Priority Data

Dec. 6, 1973 Japan............................. 48-136652

[52] U.S. Cl.................................. 303/22 R; 303/40
[51] Int. Cl.² ............................................ B60T 8/18
[58] Field of Search...... 303/6 R, 22 A, 22 R, 23 A, 303/23 R, 40, 52

[56] References Cited
UNITED STATES PATENTS

| | | | |
|---|---|---|---|
| 3,304,129 | 2/1967 | Wilson ................................. | 303/6 R |
| 3,484,138 | 12/1969 | Cumming............................ | 303/22 R |
| 3,586,389 | 6/1971 | Page et al. ......................... | 303/22 R |

*Primary Examiner*—Duane A. Reger
*Attorney, Agent, or Firm*—McGlew and Tuttle

[57] ABSTRACT

The valve comprises a relay valve unit constituted by a main valve disc having an axial exhaust bore therethrough, and normally biased to a closed position, and a control piston assembly for adjustably moving the main valve disc to the open position, and a modulated-pressure control valve unit operable to supply a pressure, modulated in accordance with the loading of the vehicle, to the control piston assembly. The control piston assembly includes first, second and third pressure-responsive pistons with the first piston being co-operable with the main valve disc and the third piston being interengageable with the first and second pistons. A loading spring is engaged with the second piston, an indicated pressure chamber is formed between the first and second pistons, and a modulated-pressure chamber is formed beneath the third piston and is in communication with the control valve unit. A stroke adjuster, operable in accordance with the loading of the vehicle, is operatively associated with the control valve unit, and the control valve unit includes a spring biased check valve opened, when the modulated pressure exceeds the supply pressure, to equalize the modulated pressure and the supply pressure.

4 Claims, 3 Drawing Figures

COMBINED LOAD SENSING PRESSURE PROPORTIONING RELAY VALVE

FIELD AND BACKGROUND OF THE INVENTION

This invention relates to a combined load-sensing proportioning relay valve for use in the air brake systems of heavy duty vehicles.

In general, air brake systems of heavy-duty vehicle comprise a compressor and an air reservoir interconnected by piping. When either the compressor or the air reservoir is damaged, it becomes impossible to supply the required supply pressure from the air reservoir, resulting in inability to provide normal brake action and incurring the danger of a serious accident.

SUMMARY OF THE INVENTION

The general object of the present invention is to provide an improved relay valve combined with a load-sensing proportioning control valve which, when the brake supply pressure is exceeded by the modulated supply pressure for some reason or other, will immediately equalize the two pressures and thereby avoid a drop of the valve output and ensure a constant braking force.

BRIEF DESCRIPTION OF THE DRAWING

The foregoing and other objects and advantages of the invention will be apparent from the following description and from the accompanying drawings, wherein.

DESCRIPTION OF THE PREFERRED EMBODIMENT

Figure 1:
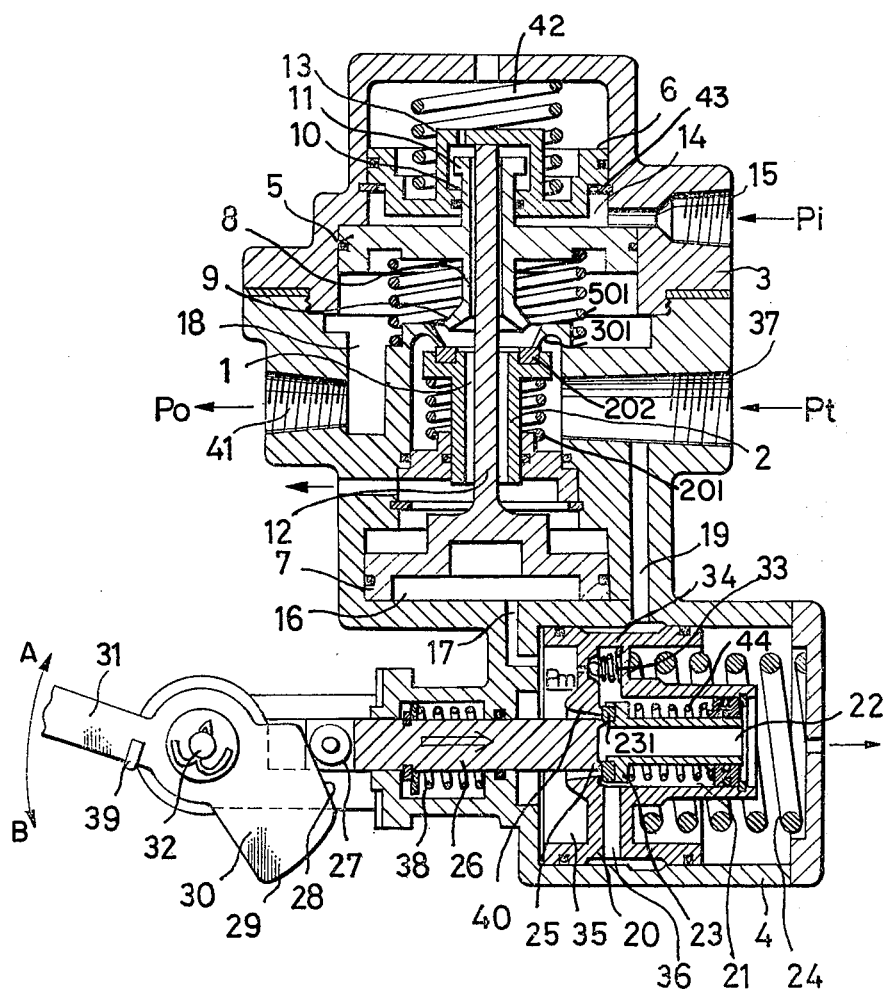
FIG. 1 is a vertical sectional view of a relay valve embodying the invention.

Referring now to FIG. 1, there is shown a relay valve according to the invention as comprising, in general, a housing 3 containing a main valve disc 2 formed with an axial exhaust bore 1 and a control piston assembly for adjustably moving the main valve disc 2 to open the valve, and a modulated-pressure control valve unit 4 for supplying a pressure modulated to suit the payload or braking load condition of the vehicle to the control piston assembly. Main valve disc 2 is biased upwardly by a return spring 201 to the position shown in FIG. 1, in which a valve seat 202 on main valve disc 2 is brought into engagement with a fixed valve seat 301 which latter is an annular valve seat sloping inwardly and downwardly.

The control piston assembly comprises three pressure-responsive pistons, namely first, second and third pistons 5, 6, 7, respectively.

The first pressure-responsive piston 5 has a central tubular downward protrusion 8, with a valve seat 9 formed at the lower end for engagement with valve seat 202 of valve disc 2. Piston 5 has also a central tubular upward protrusion 10 extending into the second pressure-responsive piston 6, with a stopper 11 at its upper end, engageable with the second piston. First pressure-responsive piston 5 is urged upwardly by a spring 501 to the position shown in FIG. 1. A loading spring 42 is provided with between the housing 3 and the upper end of the second piston 6. Loading spring 42 biases second pressure-responsive piston to engage a snap ring 43 inserted in an annular groove in the inner surface of housing 3 of the relay valve unit. The third pressure-responsive piston 7 is cooperable with second piston 6 by means of its upwardly extending rod 12 engageble with an upper boss 13 of the second piston.

Between the first and second pistons 5, 6, there is defined an indicated-pressure chamber 14 for receiving an indicated pressure Pi via a port 15. Under the third piston 7, there is formed a modulated-pressure chamber 16 for receiving a modulated pressure Pm from the control valve unit 4 through a passage 17.

Brake supply pressure Pt flows along the valve disc 2 in the open position of the latter and enters an output-pressure chamber 18 between valve seats 202 and 301 while, at the same time, part of it is led through a passage 19 into the modulated-pressure control valve unit 4.

The unit 4 comprises a pressure piston 20 reciprocably movable in the housing of unit 4, a sub-valve having an axial exhaust bore 22 exhausting and accommodated in a supply-pressure chamber 21 formed in a center boss of the piston 20, a balancing spring 24 disposed on the atmosphere side of the pressure piston 20, and an exhaust valve rod 26 formed with an exhaust valve seat 25 at its end adjacent the sub-valve. Sub-valve 23 is pushed to the left by return or balancing spring 24 to the position shown in the drawing, and has a a valve seat 231 at its left end confronting piston 20 so as to contact exhaust valve seat 25.

The other end of the rod 26 carries a roller 27, and a stroke adjuster 31, formed with a cam plate 30 having a working cam face 28 in contact with the roller 27 and an idle cam face 29, is pivoted by a pin 32 to the housing.

A check valve 33 of the ball valve type, an essential feature of the present invention, is biased by a spring 34 to the normally closed position. The inlet side of this valve communicates with the modulated-pressure chamber 16 via an output-pressure chamber 35 and the passage 17, and the outlet side with a supply-pressure port 37 via a radial passage 36, formed in the pressure piston 20 and communicating with an external circumferential groove in piston 20, and through the passage 19.

A spring 38 biases the exhaust valve rod 26 so that the roller 27 at its front end is kept in contact with the cam plate 30. Another spring 39 is provided to turn the cam plate 30 clockwise whenever the stroke adjuster 31 fails to function properly for some reason.

The operation of the relay valve constructed in the manner described in accordance with the invention is as follows.

When the brake control valve, which has not been shown in FIG. 1, is opened by a driver stepping on the brake pedal, the indicated pressure Pi at port 14 is effective in indicated pressure chamber 14. At this time, and if the vehicle is heavily loaded, the modulated pressure Pm is not imposed on the device. Accordingly, first pressure-responsive piston 5 is caused to move downwardly by the pressure in chamber 14 equal to the pressure-receiving area of piston 5 multiplied by the indicated pressure Pi, and valve seat 9, at the lowerend of downward protrusion 8, is brought into contact with main valve disc 2 which is then opened downwardly. Simultaneously, the supply pressure Pt in port 37 is effective, through the clearance between valve seats 301 and 202, in output pressure chamber 18, thus providing the output pressure Po at port 41. The output pressure Po effective in pressure chamber 18 concurrently pushes first pressure-responsive piston 5 upwardly so that the latter has its piston adjusted to a condition representing the balance between the indicated pressure Pi and the output pressure Po. Through port 41, output pressure Po is supplied to the brake actuators, such as the brake pistons.

The situation where the output pressure is the modulated pressure Pm will now be explained. When the vehicle is in an empty state, or does not contain any load, stroke adjuster 31 is rotated counterclockwise in the direction of the arrow head B, so that roller 27 comes in contact with working cam surface 28 and rod 26 is moved to the right in the direction of the arrow in FIG. 1, so that exhaust valve seat 25 closes exhaust bore 22. Subsequently, subvalve 23 is opened against the bias of spring 44.

Under these conditions, the supply pressure Pt is effective in passage 19 and radial bore 36, and thus in output pressure chamber 35 through the clearance between valve seat 40 and sub-valve 23. The pressure in pressure chamber 35, which is the modulated pressure Pm, is also effective in passage 17 and in modulated-pressure chamber 16. With the modulated pressure Pm effective beneath the third pressure-responsive pin 7, the latter is moved upwardly so that second pressure-responsive piston 6 is moved upwardly against the force of spring 42, through upwardly extending rod 12 in boss 13. Consequently, the control piston assembly is moved downwardly by a force corresponding to the difference between the downward force, acting on first pressure-responsive piston 5 by indicating pressure Pi, and the upward force, acting on second pressure-responsive piston 6. More specifically, first pressure-responsive piston 5 is pushed downwardly and this movement is restricted to the position where the stopper 11 engages a radially inwardly extending contact surface in piston 6.

Then main valve disc 2 is pushed downwardly against the bias of spring 201, by means of valve seat 9 to close exhaust bore 1 and is opened for the required flow area. Simultaneously, supply pressure Pt is effective in output pressure chamber 18 through the clearance between valve seat 301 and valve seat 202 of main valve disc 2. At this time, output pressure Po is determined by the movement of pistons 5 and 6 so that main valve disc 2 is opened for the duration of the required output to the brake actuators.

The action when the vehicle is heavily loaded will now be explained. Roller 27 occupies a position on working cam surface 28 corresponding to the magnitude of the load. Rod 26 is moved to the right in correspondence with this position, so that sub-valve 23 is opened in the same manner as described above. At this time, the pressure in output pressure chamber 35 acts in the direction of moving pressure piston 20 to the right and closing sub-valve 23.

Thus, the clearance between supply valve seat 40 and sub-valve 23 is established in a position where there is a balance with the opposing force of spring 24. Accordingly, there is obtained a modulated pressure Pm corresponding to the position of rod 26, and thus to the loading of the vehicle. The modulated pressure Pm is effective in modulated-pressure chamber 16 to raise piston 7 for the required flow area. Thus, piston 6 is raised upwardly through upwardly extending member 12, resulting in control of the movement of main valve disc 2 to determine the output pressure Po.

Normally the supply pressure Pt is higher than the modulated pressure Pm. If, for some reason, the supply pressure decreases and the modulated pressure becomes relatively higher, it follows that, as will be seen from the foregoing, a low output pressure will be applied to the brake actuators. When this is about to happen, in the embodiment being described, the ball type check valve 33, installed in the pressure piston 20 of the modulated-pressure control valve unit 4, is opened to reduce the modulated pressure Pm to a level equal to the supply pressure Pt. Here, at the point where the open check valve 33 has lowered the modulated pressure to a certain degree, the balance of force between the pressure piston 20 and the balancing spring 24 is lost. This permits the spring to force out the piston 20, leaving a sufficient gap between the supply valve seat 40 and the sub-valve 23 to establish communication between the modulated-pressure side and the supply-pressure side, thus perfectly equalizing the both pressures.

With the relay valve according to the invention, as noted above, the modulated pressure can in no circumstance exceed the supply pressure, and there is no danger of insufficient braking force regardless of the vehicle's payload condition.

Figure 2:
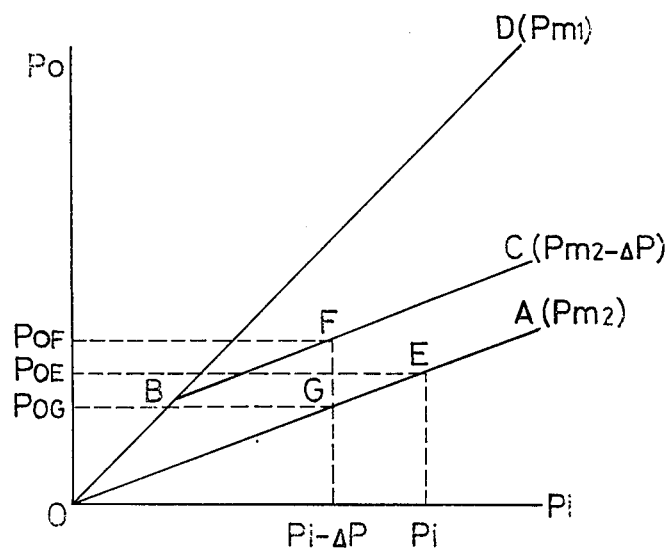
FIG. 2 is a graph showing the characteristics of the relay valve.

The performance of the relay valve with the foregoing features is graphically represented in FIG. 2. The line O–D is the output characteristic of the valve in a loaded vehicle. The line O–A is the characteristic in an unloaded state. Here, the modulated pressure, represented by Pm2, is the relation Pm1 < Pm2. If the supply pressure Pt drops, when the brake output pressure is PoE at the point E on the line O–A, that is, it differs by $\Delta P$ from Pm2, then, as will be clear from the foregoing description, the modulated pressure will change from Pm2 to Pm2 - $\Delta P$. The drop of the pressure Pt accordingly reduces the indicated pressure from the brake valve down to Pi - $\Delta P$. Thus, the valve output PoE at the point E is shifted to PoF at F. This example shows the case of Pi=Pt=Pm2. The output differential PoF - PoG represents the increment of the brake application pressure attained with the relay valve of the invention.

Figure 3:
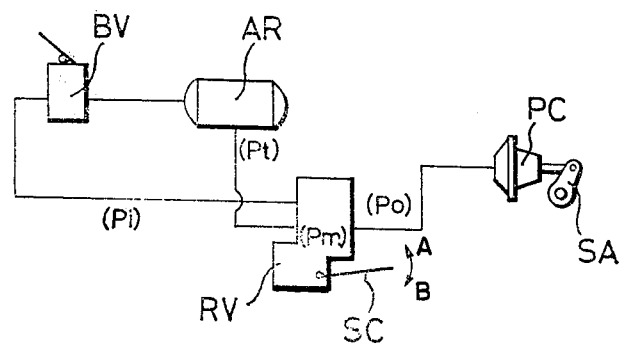
FIG. 3 is a schematic diagram of an air brake circuit incorporating the valve of the invention.

FIG. 3 schematically illustrates a typical arrangement of an air brake circuit using the relay valve in conformity with the invention. The system for the supply of indicated pressure Pi comprises an air reservoir AR, a brake valve BV, and a relay valve RV of the invention. The output pressure Po controlled by the indicated-pressure system is thence conducted from the relay valve RV to a power chamber PC, which in turn actuates a slack adjuster SA. The modulated pressure Pm is obtained through control with a stroke adjuster SC according to the payload of the vehicle.

As has been described hereinabove, the combined load-sensing proportioning relay valve of the invention offers added safety of vehicle braking because the ratio of the output pressure to the indicated pressure remains unchanged, regardless of the payload, even if the pressure in the air reservoir has abnormally decreased.

While a specific embodiment of the invention has been shown and described in detail to illustrate the application of the principles of the invention, it will be understood that the invention may be embodied otherwise without departing from such principles.

We claim:

1. A combined load-sensing and pressure-proportioning relay valve, for a vehicle air brake system, comprising, in combination, a relay valve unit including a relay valve body formed with a first inlet port for connection to a source of indicated pressure for controlling brake application, a second inlet port for connection to a source of brake supply pressure, an outlet port for connection to the air brake actuators, and an exhaust port, a main valve disc in said relay valve body controlling communication between said second inlet port and said outlet port and having an axial exhaust bore communicating with said exhaust port, means in said relay valve body biasing said main valve disc to a closed position blocking communication between said second inlet port and said outlet port and said exhaust bore, and a control piston assembly in said relay valve body operable to adjustably displace said main valve disc to an open position; and a modulated-pressure control valve unit communicating with said relay valve unit and supplying, to said control piston assembly, a pressure modulated according to the loading of the vehicle; said control piston assembly including first, second and third pressure-responsive pistons; said first and second pressure-responsive pistons conjointly defining, with said relay valve body, an indicated pressure chamber communicating with said first inlet port; said first pressure-responsive piston and said relay valve body defining an output pressure chamber communicating with said outlet port; said third pressure-responsive piston and said relay valve body defining a modulated-pressure chamber; said first pressure-responsive piston being engageable with said main valve disc, responsive to the indicated pressure, to close said axial exhaust bore and to displace said main valve disc to an open position connecting said inlet port to said output pressure chamber; means biasing said first pressure-responsive piston to a position disengaged from said main valve disc; a loading spring biasing said second pressure-responsive piston toward aid first pressure-responsive piston in opposition to the indicated pressure; said modulated-pressure control valve unit communicating with said second inlet port and said modulated-pressure chamber; means biasing said modulated-pressure control valve unit to a closed position blocking communication between said second inlet port and said modulated-pressure chamber; a stroke adjuster operatively associated with said modulated-pressure control valve unit and operable, responsive to vehicle loading, to open said modulated-pressure control valve unit; and a normally closed valve in said modulated-pressure control valve unit opened, responsive to the modulated pressure exceeding the brake supply pressure upon a decrease in the brake supply pressure, to equalize the modulated pressure and the brake supply pressure.

2. A combined load-sensing and pressure-proportioning relay valve, as claimed in claim 1, in which said first pressure-responsive piston is formed with a downward protrusion having a valve seat at its lower end engageable with said main valve disc, and an upward protrusion having a stopper at its upper end engageable with said second pressure-responsive piston; said second-pressure-responsive piston, upon displacement by the indicated pressure in opposition to said loading spring, engaging said stopper to lift said first pressure-responsive piston to disengage said main valve disc.

3. A combined load-sensing and pressure-proportioning valve, as claimed claim 2, in which said downward and upward protrusions are formed with coaxial bores therein; said third pressure-responsive piston having an upwardly extending protrusion engaged with said second pressure-responsive piston to lift said second pressure-responsive piston against the bias of said loading spring responsive to an increase of the pressure in said modulated-pressure chamber.

4. A combined load-sensing and pressure-proportioning relay valve, as claimed in claim 1, in which said modulated-pressure control unit comprises a second valve body formed with ports communicating with said inlet port and said modulated-pressure chamber; a cylindrical piston displaceable in said second valve body and having a transverse wall formed with an axial port therein defining an annular valve seat; said wall defining, with said second valve body, a second modulated-pressure chamber communicating with said first-mentioned modulated-pressure chamber; means biasing said piston in a direction to reduce the volume of said second modulated-pressure chamber; said piston being formed with a cylindrical extension extending away from said second modulated-pressure chamber, and with passage means communicating with said second inlet port and with the interior of said cylindrical extension; a spring biased valve mounted in said cylindrical extension and normally engaged with said annular valve seat to block communication between the interior of said extension and said second modulated-pressure chamber; said stroke adjuster including a rod extending through said port in said piston wall and engaged with said last-mentioned valve and operable to displace said last-mentioned valve out of engagement with said annular valve seat to connect the interior of said extension with said second modulated-pressure chamber; said normally closed check valve being mounted in said piston wall and controlling communication between said passage means and said second modulated-pressure chamber.

* * * * *